United States Patent [19]
Kubota

[11] 4,324,280
[45] Apr. 13, 1982

[54] INNER AIR-TUBE OF TIRE FOR BICYCLE

[75] Inventor: Hirokazu Kubota, Nishinomiya, Japan

[73] Assignee: Matsushita Electric Industrial Company, Limited, Osaka, Japan

[21] Appl. No.: 221,891

[22] Filed: Dec. 31, 1980

Related U.S. Application Data

[63] Continuation of Ser. No. 29,713, Apr. 13, 1979, abandoned.

[51] Int. Cl.³ .............................................. B60C 1/00
[52] U.S. Cl. .................................. 152/349; 152/195; 152/330 R; 152/429; 156/120; 156/122; 525/415; 525/418; 525/440
[58] Field of Search ................. 152/192, 195, 330 R, 152/349–350, 357 R, 357 A, 374, DIG. 16, DIG. 7, 429–430; 156/120, 122; 260/18 TN; 525/418, 415, 440

[56] References Cited
U.S. PATENT DOCUMENTS 2,255,146  9/1941  Becker .......................... 152/DIG. 7
2,729,618  1/1956  Müller et al. ................... 152/330 R
2,933,478  4/1960  Young et al. ...................... 525/418

Primary Examiner—Edward C. Kimlin
Assistant Examiner—Lois E. Boland
Attorney, Agent, or Firm—Lowe, King, Price & Becker

[57] ABSTRACT

An inner air-tube of a tire for bicycle, particular for racing cycle substantially composed of a thermoplastic urethane resin of a specific type. The urethane resin is comprised of a bifunctional polyol, a diisocyanate and a diol serving as a chain-propagating agent, the ratio by mole of the diisocyanate to a mixture of the bifunctional polyol and the diol being in the range of 1.05–1.10:1. The urethane resin of this type is readily after-crosslinked to improve its physical properties to a great extent.

7 Claims, 3 Drawing Figures

INNER AIR-TUBE OF TIRE FOR BICYCLE

This is a continuation of application Ser. No. 29,713, filed Apr. 13, 1979, now abandoned.

BACKGROUND OF THE INVENTION

Field of the Invention

This invention relates to a bicycle and more particularly, to an inner air-tube of the tire for a bicycle, particularly a racing bicycle.

As is well known, the tire tube for the racing cycle is required to have high strengths and light weight so as to stand use under conditions of high pressure and high speed. Whether the above requirement is satisfied or not is greatly influenced by the performance of the inner air-tube of the tire. Accordingly, much care is paid to selection of materials for the inner tube of the cycle tire and very high processing techniques are needed for making of such tube.

Several types of the inner tube of the tire are known including those made from latice of natural rubber, those obtained by extruding and vulcanizing natural rubber or butyl rubber, and the like. However, those known tubes have all advantages and disadvantages and are not necessarily satisfactory in practice. For instance, the tubes obtained from the rubber latice or by extrusion and vulcanization of natural rubber are great in tensile strength, elongation and resistances to tear and puncture and also in repulsion elasticity, thus showing good running performance, but are disadvantageously low in retentivity of air and resistance to aging. On the other hand, the extruded and vulcanized tubes of butyl rubber show excellent air retentivity and aging resistances to puncture and burst but are smaller in tensile strength, tear resistance and resistances to puncture and burst. In addition, they exhibit poor repulsion elasticity and a poor resistance to abrasion, thus impeding the running performance. The physical strengths of these two types of the tubes are summarized in Table 1 below as determined according to the methods prescribed in Japanese Industrial Standards.

TABLE 1

|  | Tube from Natural Rubber Latex | Extruded and Vulcanized Tube of Butyl Rubber |
|---|---|---|
| tensile strength (kg/cm$^2$) | 300 | 130 |
| elongation (%) | 700 | 650 |
| tear strength (kg/cm) | 40 | 30 |
| repulsion elasticity | 70–80 | 40–50 |
| air retentivity* | 1 | 7.5 |

Note
*The air retentivity is expressed in terms of an index when the latex tube is taken as 1.

SUMMARY OF THE INVENTION

It is an object of the present invention to provide an inner air-tube of a tire for a bicycle, particularly a racing cycle, which overcomes the above-described disadvantages of the prior art counterparts.

It is another object of the present invention to provide an inner air-tube of the racing cycle tire which uses a thermoplastic urethane resin of a specific type.

It is a further object of the present invention to provide an inner air-tube of the racing cycle tire which shows high physical strengths and high elasticity but is small in permanent elongation.

The above objects can be achieved, according to the invention, by an inner air-tube substantially composed of a thermoplastic urethane resin which comprises a bifunctional polyol having a molecular weight of about 1500–2500, a diisocyanate having a molecular weight of about 200–250, and a diol having a molecular weight of about 62–180, the ratio by mole of the diisocyanate, i.e. an NCO-containing component, to a combination of the bifunctional polyol and the diol, i.e. the OH-containing components, being in the range of 1.05–1.10:1.

In a preferred aspect of the present invention, the ratio by mole of the diol to the bifunctional polyol is in the range of 1–4:1. Further, the urethane resin tube is preferred to be after-crosslinked by allowing it to stand under conditions sufficient to induce the after crosslinkage.

PARTICULAR DESCRIPTION OF THE INVENTION

Figure 1:
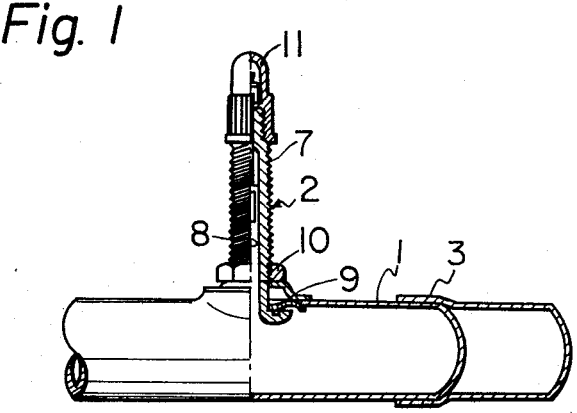
FIG. 1 is a schematical view, partly in section, of part of an inner air-tube with an air valve according to the invention.

As described hereinbefore, the inner air-tube for the racing cycle tire which is used under high pressure and high speed conditions is needed to have high physical strengths and high elasticity and small permanent elongation. This is why vulcanized rubber elastomers have been widely used but thermoplastic synthetic resins which are usually linear polymers with poor elasticity and great permanent elongation have never been employed at all.

It has now been found that a thermoplastic urethane resin of a specific type which has such a composition that a slight excess of free NCO groups as compared with corresponding OH groups to be reacted therewith are present therein so as to cause an after-crosslinking reaction to occur such as by allophanate or biuret linkages derived from the excess NCO groups becomes high in physical strengths and elasticity and small in permanent elongation. Thus, such urethane resin is most suitably applicable as a tire tube for racing cycle which must stand use under high pressure and high speed conditions.

The thermoplastic urethane resin is, as well known, a general term for linear polymers which contain the —NHCOO— linkage in recurring units of their main chain, typical of which are those which consist of bifunctional polyols to be an OH group-containing component, diols serving also as a chain-propagating agent and diisocyanates and are produced by interacting these compounds under such conditions that the ratio by mole of the NCO group-containing component to the OH group-containing components, i.e. the NCO/OH ratio, is nearly 1. The urethane resin of the just-mentioned type can be expressed by the chemical formula of the following recurring units

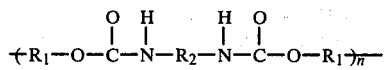

in which each $R_1$ is a residue of the bifunctional polyol or diol, $R_2$ is a residue of the diisocyanate, and n is an integer. The nature of the urethane resin, i.e. completely thermoplastic or incompletely thermoplastic, is utterly dependent on the value of the NCO/OH ratio.

In general, the urethane resin varies in its properties to a great extent depending on the types of polyol, glycol and diisocyanate and has utility in various fields mainly due to its inherent elasticity and excellent physical properties. However, application of the known urethane resins as the inner tube of the tire of the type discussed hereinbefore will not produce good results because their elasticity is still insufficient and permanent elongation is too great.

We have found that the urethane resin which is substantially composed of a bifunctional polyol, a diisocyanate and a glycol in a molar ratio of the diisocyanate to a combination of the bifunctional polyol and the diol, i.e. the NCO/OH molar ratio, is in the range of 1.05–1.10:1 is most suitable as the inner tube of the cycle tire especially when it is shaped into the tube and then undergoes a so-called after-crosslinkage. That is, when molded and processed into a tubing and allowed to stand at room temperature or elevated temperature for a time sufficient to substantially complete the after-crosslinkage, the urethane resin is crosslinked by biuret or allophanate linkages derived from the excess of the NCO groups remaining unreacted. The crosslinked resin naturally increases in elasticity and remarkably decreases in permanent elongation and is thus very suitable for the purpose of the invention.

The time required for inducing a substantial degree of the after-crosslinkage is at least 2 months, preferably 6 months at room temperature and is about 96 hours, for example, at 70° C. The time is solely dependent on the temperature used. It is to be noted that too high temperature is undesirable since the resin per se is apt to be acceleratedly deteriorated.

The biuret and allophanate linkages are represented as follows.

Biuret Linkage

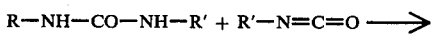

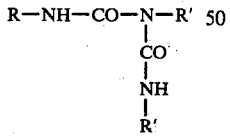

Allophanate Linkage

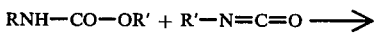

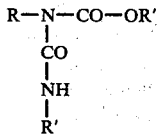

The bifunctional polyol which is one component of the thermoplastic urethane resin according to the invention is a polyester diol having a molecular weight of about 1500–2500 with OH groups at both ends and including (a) Polyethylene adipate of the formula

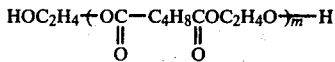

(b) Poly(1,4-butylene adipate) of the formula

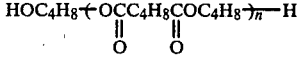

(c) Poly(1,6-hexane adipate)

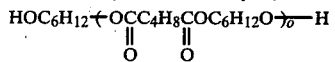

(d) Polycaprolactone of the formula

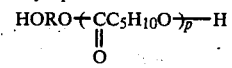

(e) Polycarbonate of the formula

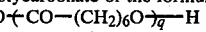

wherein m, n, o, p and q are independently an integer to satisfy the molecular weight of 1500–2500. Further, there may be likewise used polyether diols such as polyoxytetramethylene glycol of the formula

The diols are glycols having a molecular weight of about 62–180 and including, for example, ethylene glycol, butylene glycol, 1,4-butanediol, 1,5-pentanediol, 1,4-hexanediol, 1,6-hexanediol, 1,7-heptanediol, 1,8-octanediol, 1,9-nonanediol, 1,10-decanediol, cyclohexane-1,2-diol, cyclohexanel,4-diol and the like. Of these, ethylene glycol, butylene glycol and 1,4-hexanediol are preferably used.

The diisocyanates are those having a molecular weight of about 200–250 such as, for example, 4,4'-diphenylmethanediisocyanate, 4,4'-dicyclohexylmethanediisocyanate and isophoronediisocyanate. Of these, 4,4'-diphenylmethanediisocyanate is preferably used. Most preferably, a caprolactone with a molecular weight of 1600, 1,4-hexanediol and 4,4'-diphenylmethanediisocyanate are used in combination for the purpose of the invention.

In practice, when the moles of the polyol, diisocyanate and diol or glycol are, respectively, taken as A, B and C, the ratio B/A+C of the NCO group-containing component to the OH group-containing components in the urethane resin should be in the range of 1.05–1.10:1. Less ratio than 1.05:1 will produce a urethane resin which lacks elasticity and is unsatisfactory for use as the inner tube, whereas larger ratio will produce a resin of the completely crosslinking type, thus rendering the extrusion impossible and not obtaining a molded tube.

In addition, the ratio C/A is preferably in the range of 1–4:1 as indicated hereinbefore.

The urethane resin according to the invention can be readily prepared by any usual manner and its preparation is not particularly described herein.

The thermoplastic urethane resin having such composition as described above shows a hardness 75–85, a tensile strength of 300–400 kg/cm$^2$, an elongation of 550–650% and a repulsion elasticity of 40–50% when determined by the method prescribed in Japanese Industrial Standards, respectively. From this it will be understood by comparison with the data of Table 1 that the urethane resin is much more excellent than the natural rubber and butyl rubber.

The urethane resin can be readily molded into tubes by any of known techniques and usually by an extrusion. The urethane resin is first pelletized and the pellets are preferably pretreated by drying them at a mild temperature of about 80° C. for several hours. The extrusion can be effected under usually employed conditions which will be described particularly in Example 1 appearing hereinlater. It is important to note that the extruded tube is markedly improved in physical strengths by allowing it to stand under conditions described hereinbefore through it may be usable immediately after the molding, if required.

As usual, the urethane resin may be added with known additives such as a blocking inhibitor such as zinc stearate and a colorant such as carbon black prior to the molding procedure.

The present invention will be particularly described in the following examples.

EXAMPLE 1

An incompletely thermoplastic urethane resin was prepared by polymerizing under heating conditions a caprolactone ester having a molecular weight of 1500-2500, 4,4'-diphenylmethanediisocyanate as a diisocyanate, and a glycol, as a diol, having a molecular weight of 80-180 in such molar mixing ratio that $C/A=2-3:1$ and $B/A+C=1.05:1$. The resin was then pelletized as usual. The pellets were dried, prior to extrusion, at 80° C. for 8 hours to preclude an adverse influence of moisture on the extrusion process. The thus dried pellets were charged into an ordinarily employed extruder for plastics. The extruder had a diameter of screw of 65 mm, and L/D value of 22 and was operated at 20-60 r.p.m. at temperatures of 150° C. in the rear part of the cylinder, 170° C. in the intermediate part, 175° C. in the front part, and 180° C. in the dies. As a result, a tubing having a thickness of 0.25-0.35 mm and a folded width of 28 mm was obtained and was then cooled and cut in predetermined lengths.

The pellets and the extruded tube aged at 20° C. for 2 and 6 months had the following physical properties.

TABLE 2

|  | Starting Pellets | Tube Aged for Two Months | Tube Aged for Six Months |
| --- | --- | --- | --- |
| hardness* | 78 | 80 | 82 |
| tensile strength (kg/cm$^2$) | 323 | 400 | 420 |
| elongation (%) | 560 | 550 | 525 |
| tear strength (kg/cm) | 95 | 105 | 110 |
| permanent elongation (%) | 16.2 | 6.0 | 2.5 |

Note:
*These physical strengths were determined by methods prescribed in JIS herein and whenever appearing hereinafter.

As will be clear from the above results, the aging after the molding contributes to increase the tensile and tear strengths and decrease the permanent elongation to a great extent. Thus the aged tube is believed to be especially favorable for use as an inner tube of the cycle tire.

Figure 2:
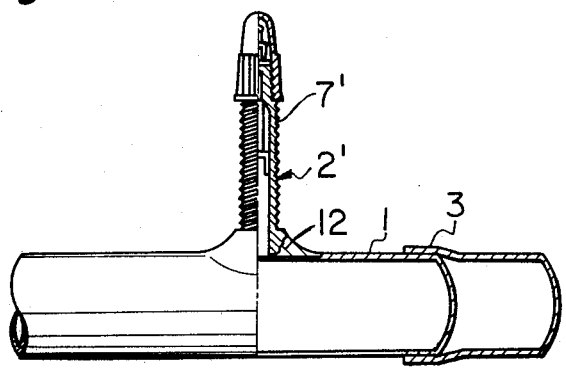
FIG. 2 is a view similar to FIG. 1 using another type of an air valve.
Figure 3:
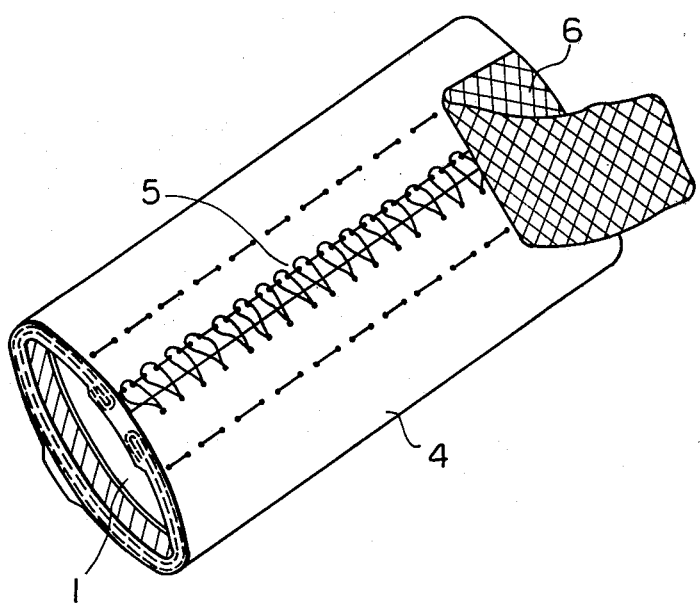
FIG. 3 is a perspective view showing part of a racing cycle tire mounting therein the inner air-tube according to the invention.

The cut-in-length tube obtained above, indicated at 1 in FIG. 1, was attached with an air valve 2 having a threaded valve stem 7 and a valve core 8. The air valve 2 was mounted on and fixedly secured to a metal valve seat 9 by means of a nut 10. A cap 11 was disposed at the top of the valve 2 as usual. Instead of using the metal seat 9 and the nut 10, an air valve 2' of FIG. 2 using a rubber seat or base could be similarly used. In this case, rubber base 12 was molded integrally with a valve stem 7' by the use of a thermoplastic urethane resin of the same type as used for the tube body. Rubber base 12 was bonded to the tube body by means of an adhesive or was thermally fused with the tube body by a high frequency or ultrasonic technique. The tube attached with the air valve 2 or 2' was made endless by inserting one free end into the other in a length of about 10 mm and combining or bonding them together by the use of an adhesive. The combined portion is indicated at 3. As a matter of course, the bonding may be conducted by a butt joint or by lapping one end with the other in a length of about 5 mm and thermally fusing them together by a high frequency or ultrasonic technique.

The physical properties of the thermoplastic urethane resin tube thus obtained are shown in Table 3 below, together with those of the known tubes from natural rubber latex and also from butyl rubber generally used with the tire tube.

TABLE 3

|  |  | Natural Latex Rubber Tube | Butyl Rubber Tube | Tube of Invention |
| --- | --- | --- | --- | --- |
| immediately after molding | tensile strength (kg/cm$^2$) | 307 | 130 | 637 |
|  | elongation (%) | 620 | 675 | 575 |
|  | 300% modulus (kg/cm$^2$) | 22 | 40 | 105 |
|  | tear strength (kg/cm) | 40 | 35 | 116 |
|  | permanent elongation (%) | 2.8 | 3.8 | 16.2 |
| after heating at 70° C. for 96 hours | tensile strength (kg/cm$^2$) | 205 | 120 | 665 |
|  | elongation (%) | 500 | 600 | 545 |
|  | 300% modulus (kg/cm$^2$) | 33 | 50 | 130 |
|  | tear strength (kg/cm) | 25 | 27 | 110 |
|  | permanent elongation (%) | 1.5 | 2.0 | 2.0 |

As will be apparent from the above results, the tube according to the invention shows much greater tensile, tear and 300% modulus stengths, leading to greater resistances to puncture and burst.

EXAMPLE 2

A flat rubber belt including a cloth layer was made by molding in a usual molding drum and then vulcanized in a usual vulcanization mold. The urethane resin tube of Example 1 was placed on and then enclosed with the belt. The belt was sewed along the end edge portions thereof to combine them together, which faced a rim on setting, by the use of a tressure sewing machine so as to shape a tubular form. The sewed portion 5 was covered with a cotton cloth tape 6 called "flap" and bonded together by means of an adhesive to make a bicycle tire for racing. The specifications, physical properties and life time by a drum running test of this tire are shown in Table 4 below.

It will be noted that the running durability appearing in the table was determined by a test method wherein an iron drum of a diameter of 65 cm provided with two 10 mm by 10 mm shock square bars at a distance on the inner surface and the tire with an inner pressure of 7-8 kg/cm$^2$ were forced to contact under a load of 75 kg and was run at a speed of 40 kg/hour.

TABLE 4

|  |  | Tire Including the Inner Air-Tube of the Invention | Tire Including Natural Rubber Inner Air-Tube |
|---|---|---|---|
| weight of tire make-ups (g) | tire | 110 | 120 |
|  | inner tube | 45 | 50 |
|  | sewing threaded and flap | 25 | 30 |
| tire cloth layer | | nylon thread of 210 denier | silk thread |
|  | the number of threads per cm | 40 | 45 |
|  | strength per cm | 65 kg | 45 kg |
| inner tube | thickness (mm) | 0.30 | 0.40 |
|  | tensile strength (kg/cm$^2$) | 675 | 305 |
| tread rubber | tensile strength (kg/cm$^2$) | 210 | 225 |
|  | elongation (%) | 525 | 600 |
|  | hardness | 65 | 57 |
| running durability | | After 10,000 km run, no abnormality was observed in the tire cloth layer and the inner tube except that the tread rubber was worn out. | Only by a 3000 km run, the tread rubber was violently worn out and the sewing threads of the cloth layer were broken with a burst of 5 cm in length |
| burst test using hydraulic pressure | | No burst occurred even at 30 kg/cm$^2$. | Bursted in a length of 5 cm at 25 kg/cm$^2$. |

Finally, the air retentivity of the tube-mounted tire according to the invention was determined by a method in which air was filled in the inner tube under pressure and the change of the inner pressure was observed with a lapse of time by day. For comparison, the air retentivities of the tires using the inner tubes from the natural latex rubber and butyl rubber were also determined. The test results are shown in Table 5 below.

TABLE 5

| Days | Inner Pressure (kg/cm$^2$) | | | | | |
|---|---|---|---|---|---|---|
|  | 0 | 5 | 10 | 15 | 20 | 25 |
| tube from natural rubber latex | 8 | 5.0 | 3.0 | 2.0 | | |
| tube obtained by extruding and vulcanizing butyl rubber | 8 | 7.6 | 6.9 | 6.0 | 5.5 | 5.0 |
| tube of the invention | 8 | 7.8 | 7.1 | 6.2 | 5.7 | 5.3 |

From the above results, it will be seen that the tube of the present invention is much more excellent in air retentivity than the tube from the natural rubber latex and is approximately equal to the butyl rubber-extruded and vulcanized tube.

In short, the tube according to the invention is light in weight and excellent in various physical properties and is greatly improved in resistances to puncture and burst over the known vulcanized rubber tubes.

What is claimed is:

1. An inner air-tube of a bicycle tire, said inner air tube substantially composed of a thermoplastic urethane resin capable of undergoing after-crosslinkage at room temperature and of thereby having improved strength, said resin comprising a bifunctional polyol having a molecular weight of about 1500-2500, a diisocyanate having a molecular weight of about 200-250, and a diol having a molecular weight of about 62-180, the ratio by mole of NCO in the diisocyanate to OH in the combination of the bifunctional polyol and the diol being in the range of 1.05-1.10:1; said bifunctional polyol being a polycaprolactone with a molecular weight of about 1500-2500.

2. An inner air-tube according to claim 1, wherein the ratio by mole of the diol to the bifunctional polyol is in the range of 1-4:1.

3. An inner air-tube according to claim 1, wherein the thermoplastic urethane resin is an after-crosslinked resin, the after-crosslinking occurring after the resin has been formed into said tube.

4. An inner air-tube according to claim 1, wherein said thermoplastic urethane resin has the following specifications:

| hardness | 75-85 |
|---|---|
| tensile strength | 300-400 kg/cm$^2$ |
| elongation | 550-650% |
| repulsion elasticity | 40-50% | when determined according to the methods prescribed in Japanese Industrial Standards.

5. An inner air-tube according to claim 1, wherein said polycaprolactone has a molecular weight of 1600.

6. An inner air-tube according to claim 1, wherein said polycaprolactone has a molecular weight of 1600, said diisocyanate is 4,4'-diphenylmethanediisocyanate, and said diol is 1,4-hexanediol.

7. An inner air-tube according to claim 1, wherein said diol is selected from the group consisting of ethylene glycol, butylene glycol, and 1,4-hexane diol.

* * * * *

UNITED STATES PATENT OFFICE
CERTIFICATE OF CORRECTION

PATENT NO. : 4,324,280
DATED : April 13, 1982
INVENTOR(S) : Hirokazu KUBOTA

It is certified that error appears in the above-identified patent and that said Letters Patent are hereby corrected as shown below:

Cover page, following Item [22], add:

--Foreign Application Priority Data

April 14, 1978        Japan        53-44705--

Signed and Sealed this

Nineteenth Day of April 1983

[SEAL]

Attest:

GERALD J. MOSSINGHOFF

Attesting Officer    Commissioner of Patents and Trademarks